UNITED STATES PATENT OFFICE 2,559,576

PROCESS FOR POLYMERIZATION WITH TETRABOROHYPOPHOSPHORIC ACID CATALYST

Warren W. Johnstone, Riverside, Ill., assignor to Universal Oil Products Company, Chicago, Ill., a corporation of Delaware No Drawing. Application June 25, 1947, Serial No. 757,065

9 Claims. (Cl. 260—683.15)

This invention relates to the polymerization of polymerizable compounds in the presence of a novel polymerization catalyst. It is more particularly concerned with the catalytic polymerization of olefins containing more than two carbon atoms.

In one embodiment my invention relates to a process which comprises subjecting a polymerizable compound to the action of a borophosphoric acid polymerization catalyst at polymerizing conditions.

In a more specific embodiment my invention relates to a process which comprises subjecting an olefinic hydrocarbon containing more than two carbon atoms to the action of a borophosphoric acid polymerization catalyst at polymerizing conditions.

The compounds that may be converted to higher molecular weight polymers thereof in the presence of my catalyst consist of those substances that are capable of polymerizing in the presence of acid-type catalysts. Among the preferred compounds of this type are monoolefinic hydrocarbons such as propylene, 1-butene, 2-butene, isobutylene, pentenes, hexenes, styrene, methyl styrene, and indene; and diolefinic hydrocarbons such as butadiene, isoprene, cyclopentadiene, and cyclohexadiene. Ethylene undergoes very little reaction at the polymerization conditions usually employed, hence, it seldom is used in my process. Other compounds that may be polymerized in the presence of my catalyst include acetylenic hydrocarbons such as acetylene, and methyl acetylene, haloolefins such as vinyl chloride, and other non-hydrocarbon substances such as coumarone, unsaturated alcohols, ethers, aldehydes, and ketones, and the like.

The charging stock to my process may comprise a pure polymerizable compound such as propylene or a mixture of a polymerizable compound and an inert material such as a mixture of propylene and propane. Further, mixtures of polymerizable compounds, such as blends of propylene and butenes, or a mixture of indene and coumarone, may be charged to my process for the purpose of obtaining cross-polymers.

My catalyst is conveniently prepared by mixing powdered phosphorus pentoxide and powdered boric acid and adding thereto a small amount of water. The addition of water initiates a reaction that is accompanied by the evolution of fumes. The resultant mixture is slightly moist, but after drying at 95–100° C., it is dry and non-hygroscopic. A substantial portion of the material appears to correspond to the formula, $B_4O_7(H_3P_2O_6)_2$, which may be called tetraborohypophosphoric acid.

The process of my invention may be carried out in batch operation by placing a quantity of a polymerizable compound and a quantity of the catalyst in a reactor equipped with a stirring device, heating to a reaction temperature, and maintaining the contents of the reactor at said temperature for a suitable period of time. The reactor may then be cooled and the polymer recovered from the products.

The preferred method of operation is of the continuous type. The catalyst may be disposed as a fixed bed within the reactor and the reactants continuously passed through the bed at polymerizing conditions. The polymer and the effluent is recovered and the unreacted material may be recycled to the reaction zone. Fluidized type of operation also may be employed. In this method of operation, a charge stock is passed upwardly through a bed of finely divided catalyst causing the catalyst particles to become motionalized, and forming a fluid-like mass. Inasmuch as the polymerization reaction is exothermic, a portion of the catalyst may be intermittently or continuously withdrawn from the reaction zone, cooled, and returned thereto. This method of operation provides a convenient method of temperature control. Another mode of operation which may be employed, is the moving bed operation wherein a compact bed of the catalyst is continuously passed through the reaction zone concurrently or countercurrently to the incoming reactants and passed therefrom into a cooling zone from which it is returned to the reaction zone. Another alternative type of operation comprises suspending finely divided solid catalyst in a stream of charge stock and treating said suspension under suitable conditions of temperature and pressure to produce the desired reaction.

The temperature at which the process of my invention may be conducted is dependent upon the charge stock being employed. For example, when propylene is used, a reaction temperature of about 400° F. is necessary in order to induce polymerization. On the other hand, when the more readily polymerizable isobutylene is employed, considerably lower temperatures may be used. In general, said temperatures should be at least about 150° F. and preferably about at least 300° F. Temperatures much above 900° F. usually are of little benefit.

Pressure aids the reaction in my process. Consequently, substantially superatmospheric pressures usually are employed.

The liquid hourly space velocity, defined as the volume of total feed to the reaction zone divided by the superficial volume of the catalyst in said zone, usually will lie within the range of from about 0.1 to about 10.

The following examples are given to illustrate my invention, but they are not introduced with the intention of unduly limiting the generally broad scope of said invention.

EXAMPLE I

A borophosphoric acid polymerization catalyst was prepared as follows. Fifty grams of reagent grade boric acid was ground to a powder in a mortar and was then transferred to a large evaporating dish. Fifty-six grams of finely powdered reagent grade phosphorus pentoxide was then added to the evaporating dish and the materials therein were intimately mixed by stirring with a glass rod for 0.5 hour. The mixture was then pyramided and a few drops of distilled water were added at the apex. A vigorous reaction ensued followed by the evolution of fumes. The wet borophosphoric acid thus produced was then dried overnight in an oven at 95° C. The next morning it was weighed and ground to a powder. The weight of the borophosphoric acid was 93.3 grams. Prior to grinding the borophosphoric acid was gray, but after it had been powdered, it was white.

EXAMPLES II–IV

Propylene was subjected to polymerization in the presence of portions of the catalyst prepared under Example I. The tests were made by placing a quantity of the catalyst in an 850 cc. rotating autoclave equipped with a glass liner, pressuring in a blend of propylene and propane, heating at a reaction temperature for two hours, and then cooling, recovering, and analyzing the product. The operating conditions and results are shown in the following table.

Table

| Example No. | Chg. Stk. | II | III | IV |
|---|---|---|---|---|
| Catalyst: | | | | |
| Type | | Borophosphoric Acid | | |
| Grams | | 10.2 | 10.1 | 10.0 |
| Charge Stock: | | | | |
| Kind | | Propylene-Propane Blend | | |
| Grams | | 96.3 | 100.1 | 98.5 |
| Operating Conditions: | | | | |
| Temperature, °F | | 399 | 597 | 700 |
| Time, Hours | | 2 | 2 | 2 |
| Maximum Pressure, Atm | | 89 | 120 | 130 |
| Products, Grams: | | | | |
| Gas | | 87 | 75 | 38 |
| Liquid | | 12.1 | 19.0 | 18.2 |
| Unaccounted For | | 7.4 | 16.2 | 52.3 |
| Per Cent Propylene Converted, 100% weight Rec. Basis | | 8 | 23 | 47 |
| Analysis of Exit Gas, Mol Per Cent, Air Free Basis: | | | | |
| Total Olefins | 51.8 | 49.9 | 45.4 | 36.2 |
| Carbon Monoxide | 0.4 | 7.5 | 0.8 | 0.4 |
| Hydrogen | 0.0 | 0.8 | 0.4 | 0.2 |
| Paraffins | 47.8 | 41.8 | 53.4 | 63.2 |
| Analysis of Liquid Product: | | | | |
| Bromine No. | | | 119 | 123 |
| Distillation, Cumulative, Volume Per Cent at ° F. Vapor Temp.: | | | | |
| 128 | | | 0 | 0 |
| 140 | | | 2.3 | 1.2 |
| 158 | | | 9 | 11 |
| 176 | | | 21 | 25 |
| 194 | | | 31 | 36 |
| 212 | | | 39 | 43 |
| 230 | | | 44 | 48 |
| 248 | | | 49 | 53 |
| 266 | | | 56 | 59 |
| 284 | | | 66 | 67 |
| 302 | | | 72 | 75 |
| 320 | | | 78 | 80 |
| 338 | | | 82 | 84 |
| 356 | | | 85 | 86 |
| 374 | | | 87 | 93 |
| 392 | | | 91 | |

The increasing losses obtained in the successive experiments were found to be due to a leak in the autoclave. It can be seen that the degree of conversion increased markedly with increasing temperature.

The more important solid polymerization catalysts that are now used commercially are hygroscopic. Since the polymerization feed stock rarely is completely dry, these catalysts absorb water from the charge stock and gradually soften. As the catalyst, which is disposed as a fixed bed in a reactor, softens, it tends to pack together with the result that there is an increased resistance to the flow of reactants therethrough. In many instances, the maximum permissible pressure drop is reached and the plant must be shut down for replacement of the catalyst before the activity thereof has been completely spent. This shortening of the effective life of the catalyst is of considerable economic consequence. My novel polymerization catalyst, on the other hand, is nonhygroscopic and does not soften with use. Consequently, the use of my catalyst avoids one of the major problems encountered with most other polymerization catalysts.

I claim as my invention:

1. A process which comprises subjecting a polymerizable compound to the action of $$B_4O_7(H_3P_2O_6)_2$$

at polymerizing conditions.

2. A process which comprises subjecting a polymerizable olefin to the action of $$B_4O_7(H_3P_2O_6)_2$$

at polymerizing conditions.

3. A process which comprises subjecting an aliphatic mono-olefin of more than two carbon atoms to the action of $B_4O_7(H_3P_2O_6)_2$ at polymerizing conditions.

4. A process which comprises subjecting propylene to the action of $B_4O_7(H_3P_2O_6)_2$ at polymerizing conditions.

5. A process which comprises subjecting a butylene to the action of $B_4O_7(H_3P_2O_6)_2$ at polymerizing conditions.

6. A process which comprises subjecting a diolefin to the action of $B_4O_7(H_3P_2O_6)_2$ at polymerizing conditions.

7. A process which comprises subjecting butadiene to the action of $B_4O_7(H_3P_2O_6)_2$ at polymerizing conditions.

8. A process which comprises subjecting an acetylenic hydrocarbon to the action of $$B_4O_7(H_3P_2O_6)_2$$

at polymerizing conditions.

9. A process which comprises subjecting a mixture of propylene and butylene to the action of $B_4O_7(H_3P_2O_6)_2$ at polymerizing conditions.

WARREN W. JOHNSTONE.

REFERENCES CITED

The following references are of record in the file of this patent:

UNITED STATES PATENTS

| Number | Name | Date |
|---|---|---|
| 2,173,482 | Keunecke et al. | Sept. 19, 1939 |
| 2,205,159 | Stevens et al. | June 18, 1940 |
| 2,375,638 | Englund | May 8, 1945 |

FOREIGN PATENTS

| Number | Country | Date |
|---|---|---|
| 340,513 | Great Britain | Dec. 22, 1930 |
| 451,359 | Great Britain | Aug. 4, 1936 |
| 453,854 | Great Britain | Sept. 18, 1936 |
| 457,997 | Great Britain | Dec. 10, 1936 |